(12) United States Patent
Tamaki et al.

(10) Patent No.: US 7,447,269 B2
(45) Date of Patent: Nov. 4, 2008

(54) METHOD AND ADAPTIVE MODULATION IN MULTI-CARRIER COMMUNICATION

(75) Inventors: Satoshi Tamaki, Tokyo (JP); Takashi Yano, Tokorozawa (JP); Seishi Hanaoka, Tokyo (JP); Toshiyuki Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 692 days.

(21) Appl. No.: 10/926,143

(22) Filed: Aug. 26, 2004

(65) Prior Publication Data
US 2006/0008014 A1  Jan. 12, 2006

(30) Foreign Application Priority Data
Jul. 7, 2004 (JP) .............................. 2004-199997

(51) Int. Cl.
*H04L 27/00* (2006.01)

(52) U.S. Cl. ....................................... 375/260
(58) Field of Classification Search .................. 375/260
See application file for complete search history.

(56) References Cited

U.S. PATENT DOCUMENTS

| | | | |
|---|---|---|---|
| 6,611,564 B1 * | 8/2003 | Linz et al. ............... | 375/295 |
| 7,149,252 B2 * | 12/2006 | Propp et al. ............. | 375/259 |
| 2005/0063479 A1 * | 3/2005 | Propp et al. ............. | 375/260 |
| 2005/0135493 A1 * | 6/2005 | Maltsev et al. ........... | 375/260 |
| 2005/0201474 A1 * | 9/2005 | Cho et al. .................. | 375/260 |

FOREIGN PATENT DOCUMENTS

JP  2004-032125  1/2004

OTHER PUBLICATIONS

Transactions of the Institute of Electronics, Information and Communication Engineers, B-II, vol. J84-B-II, No. 7, Jul. 2001, pp. 1141-1150.
Transactions of the Institute of Electronics, Information and Communication Engineers, B-II, vol. J78-B-II, No. 6, Jun. 1995, pp. 1 435-444.
IEEE Vehicular Technology Conference (VTC), Oct. 4-9, 2003.

* cited by examiner

*Primary Examiner*—Kevin Y Kim
(74) *Attorney, Agent, or Firm*—Mattingly, Stanger, Malur & Brundidge, P.C.

(57) ABSTRACT

In a radio-communication system and a radio station, one or more subcarriers are grouped, and the maximum bit number per symbol of the modulation method used for each subcarrier is determined for each group and shared between a transmitting station and a receiving station. The transmitting station divides and allocates a coded signal to subcarriers in accordance with the bit number per symbol, modulates each of the allocated signals by a predetermined modulation method, and transmits the modulated signals. The receiving station demodulates the received signal by the predetermined modulation method, adds a signal having zero likelihood when the bit number per symbol of a modulation method for demodulation is different from a maximum bit number, and decodes the demodulated signal by summarizing the demodulated results.

21 Claims, 11 Drawing Sheets

FIG.1
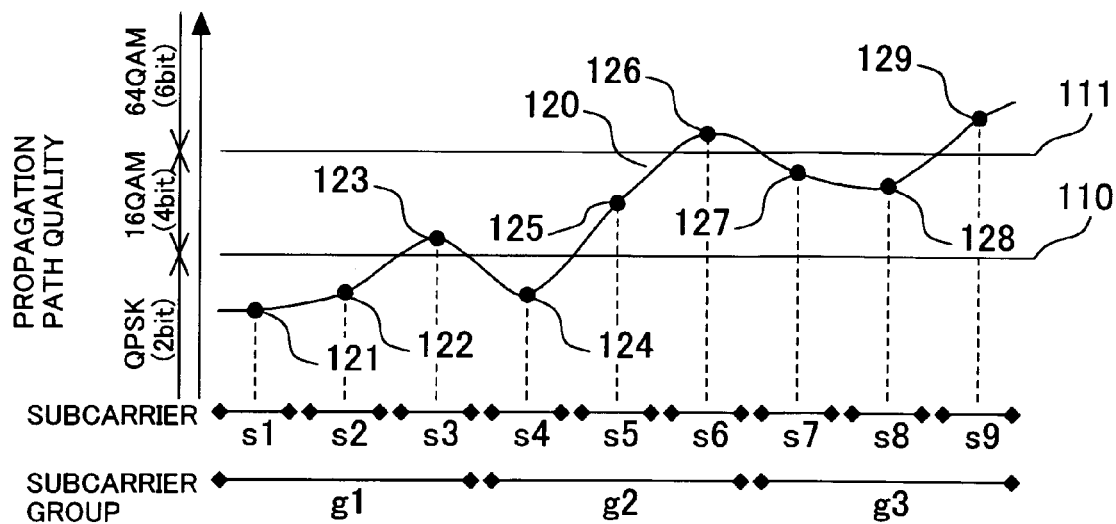
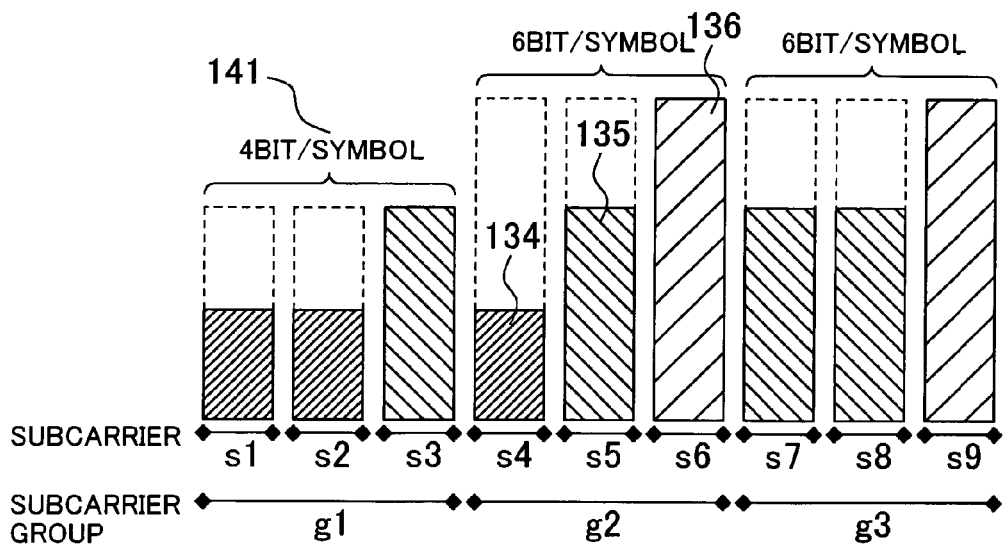

METHOD AND ADAPTIVE MODULATION IN MULTI-CARRIER COMMUNICATION

CLAIM OF PRIORITY

The present application claims priority from Japanese application JP 2004-199997 filed on Jul. 7, 2004, the content of which is hereby incorporated by reference into this application.

FIELD OF THE INVENTION

The present invention relates to a modulation control method adaptable to the varying quality when the quality of the propagation path of each carrier varies in a multi-carrier radio-communication system for communicating by use of plural carriers.

BACKGROUND OF THE INVENTION

A multilevel modulation technology is known as a means of transmitting information including plural bits per symbol in order to increase a transmission quantity per second in a radio-communication system.

In the multilevel modulation technology, as the bit number per symbol increases, the maximum throughput increases when the quality of a propagation path is good, but in contrast the throughput largely decreases when the quality thereof lowers. Therefore, in order to guarantee a stable communication, an adaptive modulation technology is proposed wherein the number of modulation levels is changed in proportion to the quality of a propagation path. The technology is explained in the paper "The transmission characteristics of a modulation-level-number-variable adaptive modulation method" (The Transactions of the Institute of Electronics, Information and Communication Engineers, B-II, Vol. J78-B-II, No. 6, pp. 435-444, June 1995) and others.

Further, with the expanding adoption of wideband in radio-communication, a multi-carrier communication method called OFDM (Orthogonal Frequency Division Multiplexing) is used wherein information is transmitted by dividing and allocating it to plural orthogonalized subcarriers and an OFDM adaptive modulation method is proposed wherein a modulation method is changed in accordance with each sub-carrier in order to cope with the variation of a propagation path quality within the band of OFDM. The technology is explained in the paper "An OFDM adaptive modulation method using multilevel transmission power control for high-speed data communication" (The Transactions of the Institute of Electronics, Information and Communication Engineers, B-II, Vol. J84-B-II, No. 7, pp. 1141-1150, July 2001) and others.

In the OFDM adaptive modulation method, the variation of a propagation path quality can be followed within a band by changing a modulation method in accordance with each sub-carrier, but in contrast a control signal is required to conform the modulation method of a subcarrier at a transmitting station to that of the same subcarrier at a receiving station, which causes complication. To cope with that problem, a technology of avoiding the complication by grouping some subcarriers and changing a modulation method in accordance with each subcarrier group is explained in the paper "An efficient blind modulation detection algorithm for adaptive OFDM systems" (IEEE Vehicular Technology Conference (VTC), Oct. 4-9, 2003).

In the aforementioned method wherein a modulation method is changed in accordance with each subcarrier, though the variation of a propagation path quality in each band can be followed, the problem exists that a control signal is additionally required to conform a modulation method at a transmitting station to that at a receiving station. Further, in the aforementioned adaptive modulation method wherein a modulation method is changed in accordance with each sub-carrier group, though the advantage is that the control signal to conform a modulation method at a transmitting station to that at a receiving station can increasingly be reduced as the number of subcarriers belonging to a group increases, the problem exists that the variation of a propagation path quality in each band cannot be followed.

SUMMARY OF THE INVENTION

The present invention has been established to solve the aforementioned problems and the object thereof is to provide: an adaptive modulation method that makes it possible to control a modulation method in proportion to the variation of a propagation path quality in a band similarly to the case where grouping is not adopted while the advantage of reducing the control signal is maintained by the grouping of sub-carriers; and a radio-communication system to which the adaptive modulation method is applied.

The adaptive modulation method according to the present invention established as a means of solving the aforementioned problems makes it possible to control a modulation method in proportion to the variation of a propagation path quality in a band similarly to the case where grouping is not adopted while the advantage of reducing the control signal is maintained by the grouping of subcarriers, by:

setting the maximum number of bits per symbol for communication to each group of subcarriers and sharing the information on the maximum bit number of each group between a transmitting station and a receiving station;

at the transmitting station, coding a signal for communication with a code having a sufficient error correction capability beforehand and thus creating a codeword;

dividing and allocating the codeword to subcarriers so that the allocated codeword at each subcarrier may have the maximum bit number;

selecting a modulation method for each subcarrier from among the modulation methods that allow the maximum bit number or smaller per symbol to communicate in accordance with the propagation path quality and modulating the allocated codeword by using the bit number capable of modulating it by the selected modulation method;

at the receiving station, selecting a modulation method for each subcarrier from among the modulation methods that allow the maximum bit number or smaller per symbol to communicate and demodulating the modulated codeword;

adding a signal of zero likelihood to the demodulation result if the number of communication bits per symbol of the selected modulation method is smaller than the aforementioned maximum bit number and outputting the demodulation result corresponding to the aforementioned maximum bit number in total at each subcarrier; and summarizing the demodulation result at each subcarrier and decoding.

The present invention provides an adaptive modulation method that makes it possible to change a modulation method for each subcarrier individually in accordance with a propagation path quality by merely conveying information on a modulation method for each subcarrier group without the need to convey information on modulation methods for all subcarriers.

BRIEF DESCRIPTION OF THE DRAWINGS

FIG. 1 is an example of an adaptive modulation method according to the present invention;

DETAILED DESCRIPTION OF THE PREFERRED EMBODIMENTS

Figure 2:
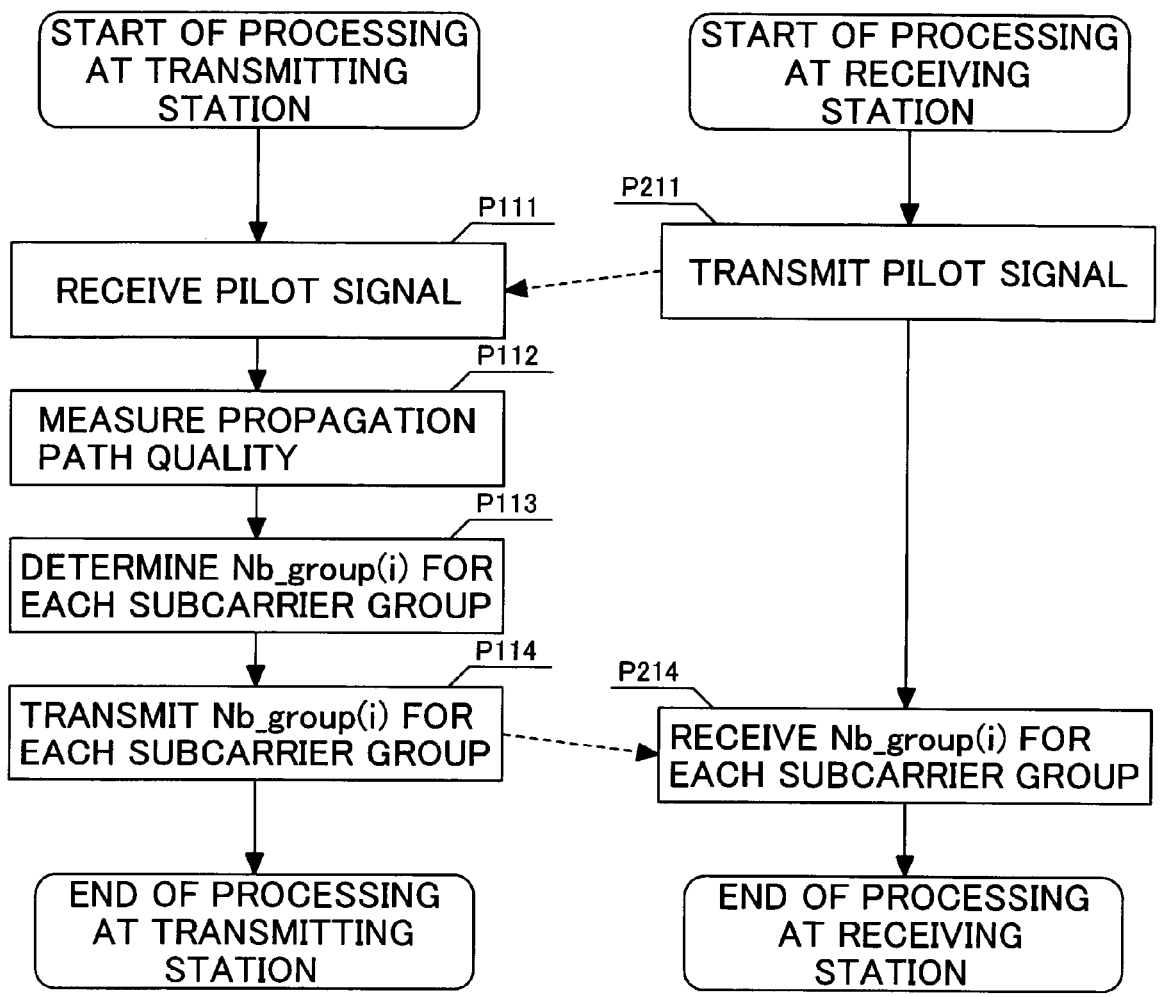
FIG. 2 is a first embodiment of the processing flow at a transmitting station and a receiving station according to the present invention.

Embodiments according to the present invention are hereunder explained by using the drawings.

A multi-carrier communication method such as OFDM is the method wherein the whole band used for communication is divided and allocated to plural subcarriers and each part of information is transmitted at each subcarrier. In such a method, the variation in the quality of a propagation path in a band, such as interference with frequency selectivity and fading with frequency selectivity caused by a delayed signal, appears as the variation in the quality of the propagation path of each subcarrier. Meanwhile, the frequency selective fading is caused by the fact that the phases to be accumulated of frequencies are different from each other when delayed signals are compounded and therefore the qualities of the propagation paths of subcarriers having adjacent frequencies tend to be similar. Further, since the grouping of subcarriers is aimed at using a common parameter for plural subcarriers, it is desirable to group subcarriers having similar propagation path qualities. Thus, the method is explained in the following example based on the case of grouping adjacent subcarriers.

As an example, an adaptive modulation method wherein the maximum transmission bit number per symbol of each subcarrier is set at six and 64QAM, 16QAM, and QPSK are used as the modulation methods is explained hereunder. However, the application of the present invention is not limited to such a maximum transmission bit number and modulation methods, and the present invention can similarly be applied to a commoner case where the maximum transmission bit number per symbol is set at 2 m and demodulation is applied by using $2^{2k}$QAM (k is a natural number of m or smaller) as the modulation method. Here, 4QAM that corresponds to k=1 in the above expression is regarded to represent the same modulation method as QPSK.

Further, in order to simplify the following explanation, an adaptive modulation method according to the present invention is explained on the basis of the case where a signal is transmitted from a first radio station to a second radio station. Then, a radio station which transmits a signal modulated by using the adaptive modulation method according to the present invention is called a transmitting station and a radio station which receives the transmitted signal modulated by using an adaptive modulation method according to the present invention is called a receiving station. Meanwhile, an adaptive modulation method according to the present invention can be applied to both the transmission from a first radio station to a second radio station and the same from the second radio station to the first radio station and, in this case, each of the first and second radio stations performs signal processing as both a transmitting station and a receiving station as it is explained below.

Here, as the propagation path quality of each subcarrier in the following explanation, any parameter can be used as long as the parameter is a value having a positive or negative correlation with, for example, the received signal power strength of each subcarrier, the interference power strength of each subcarrier, the signal to interference ratio and noise power ratio of each subcarrier, an error rate and communication quality during the transmission of a signal, the amount of mutual information between a transmitting station and a receiving station, and others.

The algorithm of an adaptive modulation method according to the present invention is hereunder explained on the basis of FIG. 1 showing the frame format thereof. Here, the number of subcarriers is nine and the number of subcarrier groups each of which is composed of three subcarriers is three in the frame format of FIG. 1. However, the application of the present invention is not limited to those numbers of subcarriers, subcarriers in each subcarrier group, and subcarrier groups, and the present invention can be applied to the case where the numbers of subcarriers, subcarriers in each subcarrier group, and subcarrier groups are more commonly employed figures.

In an adaptive modulation method of a first embodiment according to the present invention, firstly a transmitting station identifies the quality 120 of a propagation path for communication. As a means by which a transmitting station identifies the propagation path quality 120, either the transmitting station may directly measure the quality of a propagation path or the transmitting station may be notified from a receiving station of the quality measured by the receiving station.

Next, a transmitting station employing an adaptive modulation method according to the present invention determines a modulation method (first modulation method) for each subcarrier. In the selection of a modulation method for each subcarrier, the modulation method is selected so as to have the larger number of communicable bits (second bit number) per symbol according as the propagation path quality 120 of each subcarrier improves. For example, in the case of FIG. 1, on the basis of the thresholds 110 and 111, QPSK is selected when the propagation path quality of a subcarrier is less than the first threshold 110, 16QAM is selected when the propagation path quality thereof is not less than the first threshold 110 and less than the second threshold 111, and 64QAM is selected when the propagation path quality thereof is not less than the second threshold 111. With regard to the thresholds for the selection, by using the channel capacity of a propagation path as a measured propagation path quality 120 for example, it is possible to select 2 which is the maximum information amount communicable by QPSK as the threshold 110 and 4 which is the maximum information amount communicable by 16QAM as the threshold 111. In addition, in order to further improve a communication quality, it is also possible to adjust the thresholds in accordance with properties such as the error correction capability of a channel code, the allocation of the signal points in a modulation method, and the distribution of propagation path qualities.

In the example of FIG. 1, with regard to the subcarriers s4, s5, and s6 that belong to the subcarrier group g2 for example, the modulation methods are selected in such a way that the modulation method 134 for the subcarrier s4 is QPSK since the propagation path quality 124 of the subcarrier s4 is less than the threshold 110, the modulation method 135 for the subcarrier s5 is 16QAM since the propagation path quality 125 of the subcarrier s5 is not less than the threshold 110 and less than the threshold 111, and the modulation method 136 for the subcarrier s6 is 64QAM since the propagation path quality 126 of the subcarrier s6 is not less than the threshold 111. In this case, among the modulation methods selected for the subcarriers s4, s5, and s6 that belong to the subcarrier group g2, the modulation method having the largest number of bits per symbol is the 64QAM that is selected for the subcarrier s6, which is capable of communicating six bits per symbol. Therefore, it is determined that the maximum bit number per symbol of the subcarrier group g2 is six.

After the maximum bit number (first bit number) per symbol of each subcarrier group and a modulation method (first modulation method) for each subcarrier are determined, the transmitting station allocates a coded transmit signal to subcarriers so that the allocated transmit signal at each subcarrier may have the maximum bit number (first bit number) per symbol of the subcarrier group, modulates the allocated signal at each subcarrier by using the bit number (second bit number) per symbol intrinsic to the modulation method (first modulation number) determined for the subcarrier out of the distributed signal and also using the modulation method determined for the subcarrier, and then transmits the modulated signal. When the bit number (second bit number) per symbol intrinsic to the modulation method used for each subcarrier is smaller than the maximum bit number (first bit number) per symbol of the subcarrier group to which the subcarrier belongs, the amount of information corresponding to the difference is abandoned and not used for transmission.

A receiving station, similarly to a transmitting station, firstly identifies a propagation path quality, determines a modulation method (second modulation method) for each subcarrier from the identified propagation path quality, and demodulates the signal by the modulation method determined for the subcarrier. Here, when the bit number (third bit number) per symbol of the modulation method (second modulation number) determined for a subcarrier is larger than the maximum bit number (first bit number) per symbol of the subcarrier group to which the subcarrier belongs, the maximum bit number (first bit number) being conveyed from a transmitting station, a modulation method having the bit number per symbol not larger than the maximum bit number (first bit number) per symbol of the subcarrier group is selected as the modulation method used for demodulation. As a means of identifying a propagation path quality, either the receiving station may directly measure the quality of a propagation path or the receiving station may be notified from a transmitting station of the quality measured by the transmitting station. When the bit number (third bit number) per symbol of the modulation method used for demodulation in a subcarrier is less than the maximum bit number (first bit number) per symbol of the subcarrier group to which the subcarrier belongs, the maximum bit number (first bit number) being conveyed from a transmitting station, it becomes possible to realize the adaptive modulation in accordance with the propagation path quality of the subcarrier without the notification of the modulation method of the subcarrier by deeming the signal of zero likelihood having the bit number corresponding to the difference to be received, adding the deemed signal to the demodulation result, and then decoding the channel code.

Figure 3:
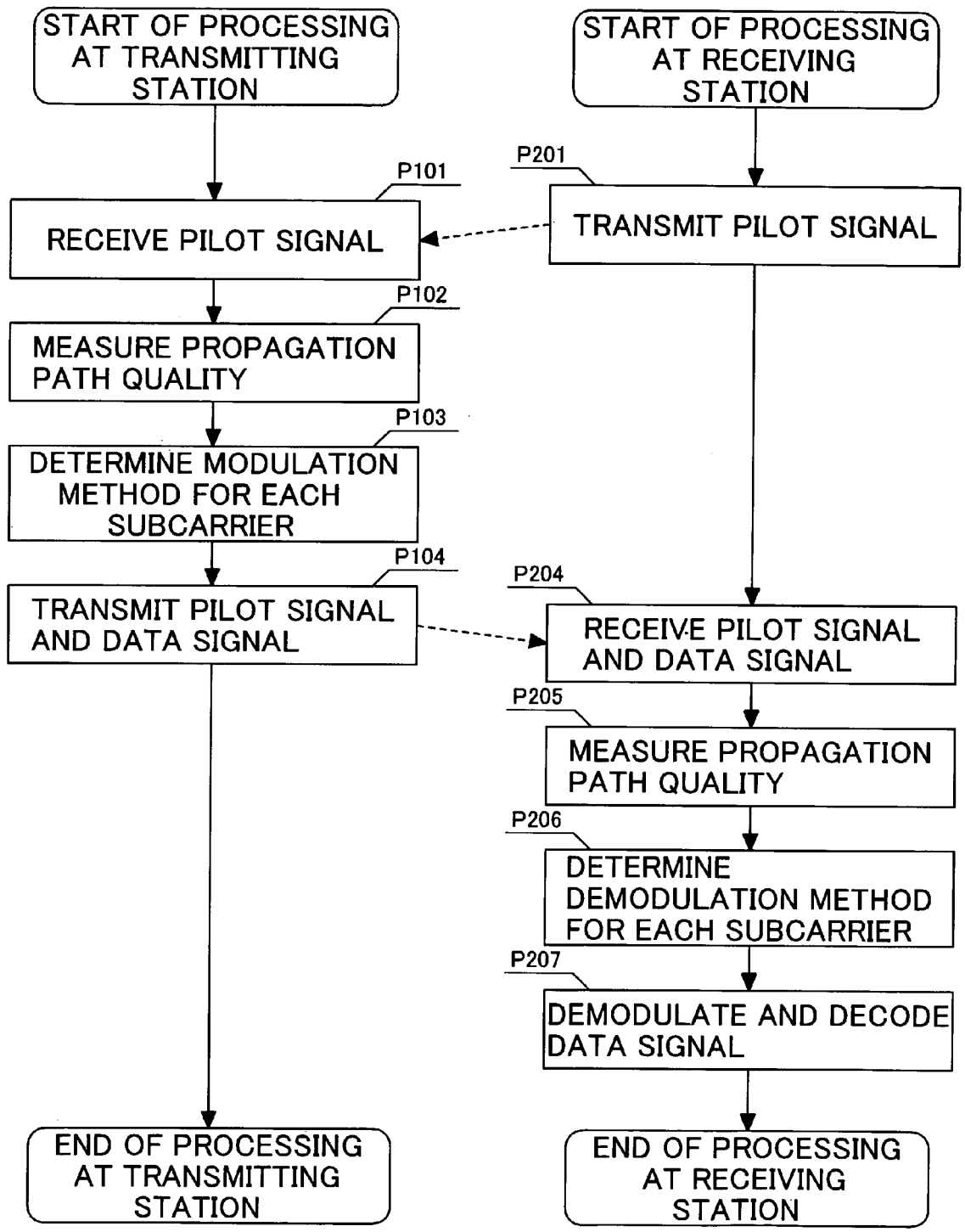
FIG. 3 is first and second embodiments of the processing flow at a transmitting station and a receiving station according to the present invention.

An example of processing flow at transmitting and receiving stations employing the aforementioned adaptive modulation method of the first embodiment according to the present invention is explained on the basis of FIG. 2, which is the flowchart of processing for determining the maximum bit number (first bit number) per symbol of each subcarrier group (referred to as "Nb_group(i)" in the figure), and FIG. 3, which is the flowchart of processing for communicating a data signal.

In the flowchart of FIG. 2, firstly the receiving station transmits at the process P211 a pilot signal to the transmitting station. Here, the pilot signal referred to here and below may be any signal as long as the signal can be used at a transmitting station as the standard signal for estimating a propagation path quality, and thus the pilot signal may be a channel for the communication of other information as long as both the transmitting and receiving stations know beforehand the complex amplitude of the signal transmitted by each subcarrier or the correlation of the complex amplitude of the signal transmitted by each subcarrier. Further, it is desirable that a pilot signal is transmitted over the whole band in order to estimate the propagation path quality of the whole band, but it is also acceptable to estimate propagation path qualities by transmitting a pilot signal only for some of subcarriers and interpolating signals at the receiving station for the other subcarriers that have not been used for the transmission.

Next, the transmitting station receives at the process P111 the pilot signal transmitted from the receiving station, measures at the process P112 the propagation path quality of each subcarrier on the basis of the received pilot signal, and determines at the process P113 the maximum bit number per symbol of each subcarrier group by using the algorithm described earlier. The information on the determined maximum bit number per symbol of each subcarrier group is transmitted at the process P114 to the receiving station and the receiving station receives the information at the process P214. Here, the maximum bit number per symbol of each subcarrier group can also be determined by using a typical propagation path quality of a subcarrier group as the standard and therefore it is also acceptable to estimate the propagation path qualities of some of subcarriers without estimating the propagation path qualities of all the subcarriers.

Next, in the flowchart of FIG. 3, the receiving station transmits at the process P201 a pilot signal to the transmitting station. Thereafter, the transmitting station receives at the process P101 the pilot signal transmitted by the receiving station, measures at the process P102 the propagation path quality of each subcarrier on the basis of the received pilot signal, and determines at the process P103 a modulation method for each subcarrier by using the algorithm described earlier. Subsequently, the transmitting station allocates at the process P104 the coded codeword to subcarriers so that the allocated codeword at each subcarrier may have the maximum bit number per symbol of the subcarrier group to which the subcarrier belongs, the maximum bit number having been determined earlier at the process P113, modulates, among the allocated signals, only the portion corresponding to the number of the bits that are transmittable by the modulation method determined in the process P103, and transmits the modulated signal together with the pilot signal to the receiving station.

The receiving station receives at the process P204 the pilot signal and the data signal, estimates at the process P205 a propagation path quality by using the pilot signal, and then determines at the process P206 the modulation method used for the demodulation at each subcarrier by using the algorithm described earlier.

Next, the receiving station demodulates at the process P207 the data signal by using the modulation method determined at the process P206, creates the received signal having the bit number corresponding to the maximum bit number per symbol for each subcarrier by deeming the bit number that falls short of the maximum bit number per symbol of each subcarrier group received at the process P214 to be filled by receiving the signal of zero likelihood, decodes the channel code every time the received signals corresponding to the code length are accumulated, and by so doing performs the communication by the adaptive modulation method of the first embodiment according to the present invention.

Here, the process flow for determining the maximum bit number per symbol of each subcarrier group and the process flow for communicating the data signal have been explained above by using the separate figures, but it is possible to carry out both the processes together at the same time. That is, the same pilot signal may be used in the processes P211 and P201 wherein signals are transmitted from the receiving station to the transmitting station, and the signals transmitted from the processes P114 and P104 wherein signals are transmitted from the transmitting station to the receiving station may be transmitted together at the same time. The process of determining the maximum bit number can be applied at the start of communication, at the time of handover, at the time when a movable terminal is registered to a base station, periodically during communication, at the time when it is judged that a propagation path quality has changed largely, or on other occasions.

Meanwhile, though the transmitting station determines the maximum bit number per symbol of each subcarrier group on the basis of a propagation path quality in the first embodiment stated above and notifies the receiving station, the method wherein the receiving station determines the maximum bit number per symbol of each subcarrier group on the basis of a propagation path quality and notifies the transmitting station or the method employed in the second embodiment can also be adopted.

In this case, in the adaptive modulation method of the second embodiment according to the present invention, firstly the receiving station identifies the quality 120 of a propagation path for communication. As a means by which a receiving station identifies a propagation path quality 120, either the receiving station may directly measure the propagation path quality or the receiving station may be notified from a transmitting station of the quality measured by the transmitting station.

Next, the receiving station employing an adaptive modulation method according to the present invention determines a modulation method for each subcarrier. In the selection of a modulation method for each subcarrier, the modulation method is selected so as to have a larger number of communicable bits per symbol according as the propagation path quality 120 of each subcarrier improves. For example, in the case of FIG. 1, on the basis of the thresholds 110 and 111, QPSK is selected when the propagation path quality of a subcarrier is less than the first threshold 110, 16QAM is selected when the propagation path quality thereof is not less than the first threshold 110 and less than the second threshold 111, and 64QAM is selected when the propagation path quality thereof is not less than the second threshold 111. With regard to the thresholds for the selection, by using the channel capacity of a propagation path as a measured propagation path quality 120 for example, it is possible to select 2 which is the maximum information amount communicable by QPSK as the threshold 110 and 4 which is the maximum information amount communicable by 16QAM as the threshold 111. In addition, in order to further improve a communication quality, it is also possible to adjust the thresholds in accordance with properties such as the error correction capability of a channel code, the allocation of the signal points in a modulation method, and the distribution of propagation path qualities.

In the example of FIG. 1, with regard to the subcarriers s4, s5, and s6 that belong to the subcarrier group g2 for example, the modulation methods are selected in such a way that the modulation method 134 for the subcarrier s4 is QPSK since the propagation path quality 124 of the subcarrier s4 is less than the threshold 110, the modulation method 135 for the subcarrier s5 is 16QAM since the propagation path quality 125 of the subcarrier s5 is not less than the threshold 110 and less than the threshold 111, and the modulation method 136 for the subcarrier s6 is 64QAM since the propagation path quality 126 of the subcarrier s6 is not less than the threshold 111. In this case, among the modulation methods selected for the subcarriers s4, s5, and s6 that belong to the subcarrier group g2, the modulation method having the largest number of bits per symbol is the 64QAM that is selected for the subcarrier s6, which is capable of communicating six bits per symbol. Therefore, it is determined that the maximum bit number per symbol of the subcarrier group g2 is six. The receiving station notifies the transmitting station of the information on the determined maximum bit number per symbol of each subcarrier group.

A transmitting station, similarly to a receiving station, firstly identifies a propagation path quality and determines a modulation method for each subcarrier from the identified propagation path quality. As a means of identifying a propagation path quality, either the transmitting station may directly measure the quality of a propagation path or the transmitting station may be notified from a receiving station of the quality measured by the receiving station. Here, when the maximum bit number per symbol of the modulation method determined for a subcarrier is larger than the bit number per symbol of the subcarrier group to which the subcarrier belongs, the bit number being conveyed from a receiving station, a modulation method having the bit number per symbol not larger than the maximum bit number per symbol of the subcarrier group is selected as the modulation method used for modulation.

After a modulation method for each subcarrier is determined, the transmitting station allocates a coded transmit signal to subcarriers so that the allocated transmit signal at each subcarrier may have the maximum bit number per symbol of the subcarrier group, modulates the allocated signal at each subcarrier by using the bit number per symbol intrinsic to the modulation method determined for the subcarrier out of the allocated signals and also using the modulation method determined for the subcarrier, and then transmits the modulated signal.

The receiving station demodulates the signal transmitted from the transmitting station by using the modulation method determined for each subcarrier. When the bit number per symbol of the modulation method used for demodulation at each subcarrier is less than the determined maximum bit number per symbol of the subcarrier group to which the subcarrier belongs, it becomes possible to realize the adaptive modulation in accordance with the propagation path quality of the subcarrier without the notification of the modulation method for the subcarrier by deeming the signal of zero likelihood having the bit number corresponding to the difference to be received, adding the deemed signal to the demodulation result, and then decoding the channel code.

Figure 4:
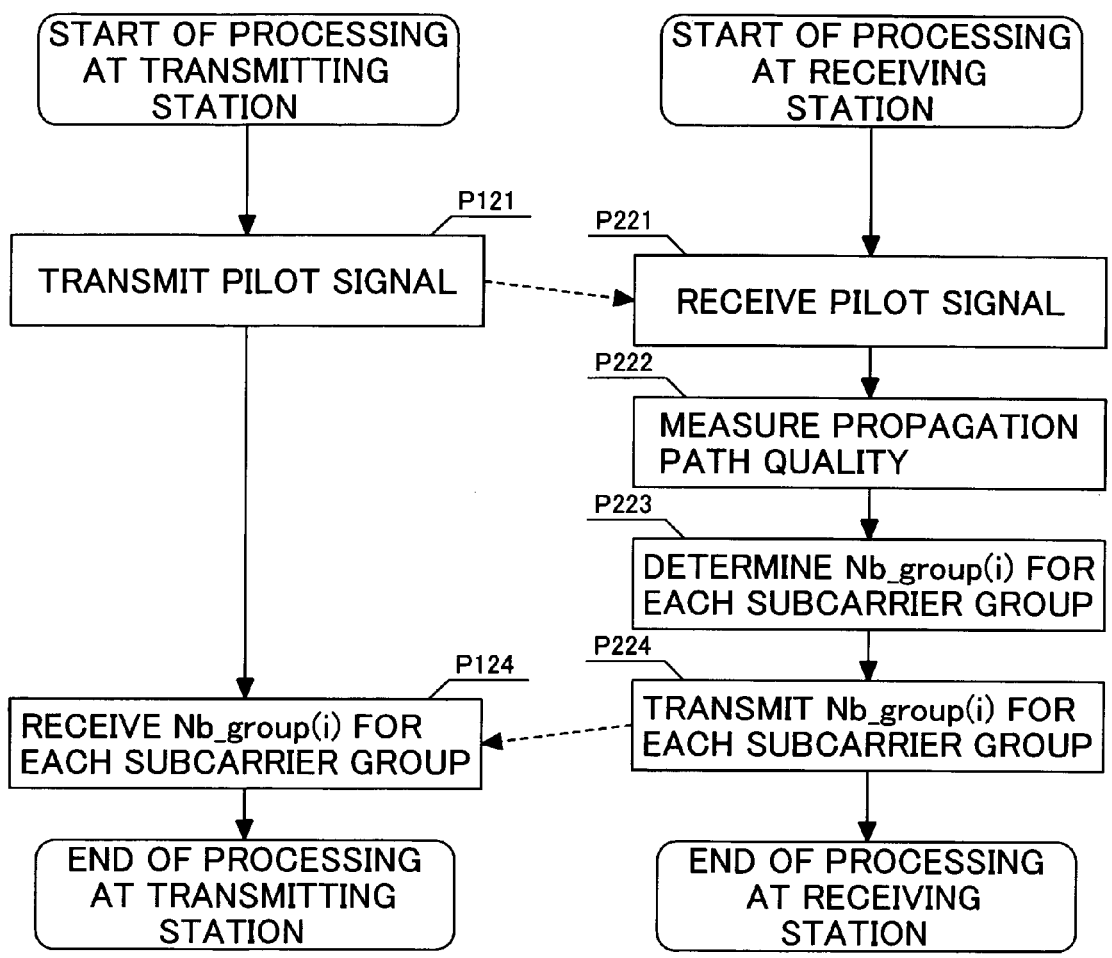
FIG. 4 is the second embodiment of the processing flow at a transmitting station and a receiving station according to the present invention.

An example of processing flow at the transmitting and receiving stations employing the aforementioned adaptive modulation method of the second embodiment according to the present invention is explained on the basis of FIG. 4, which is the flowchart of processing for determining the maximum bit number per symbol of each subcarrier group, and FIG. 3, which is the flowchart of processing for communicating a data signal.

In the flowchart of FIG. 4, firstly the transmitting station transmits at the process P121 a pilot signal to the receiving station. Here, the pilot signal referred to here and below may be any signal as long as the signal can be used at a transmitting station for estimating a propagation path quality, and thus the pilot signal may be a channel for the communication of other information as long as both the transmitting and receiving stations know beforehand the complex amplitude of the signal transmitted by each subcarrier or the correlation of the complex amplitude of the signal transmitted by each subcarrier.

Next, the receiving station receives at the process P221 the pilot signal transmitted from the transmitting station, measures at the process P222 the propagation path quality of each subcarrier on the basis of the received pilot signal, and determines at the process P223 the maximum bit number per symbol of each subcarrier group by using the algorithm described earlier. The information on the determined maximum bit number per symbol of each subcarrier group is transmitted at the process P224 to the transmitting station, and the transmitting station receives the information at the process P124.

Next, in the flowchart of FIG. 3, the receiving station transmits at the process P201 a pilot signal to the transmitting station. Thereafter, the transmitting station receives at the process P101 the pilot signal transmitted by the receiving station, measures at the process P102 the propagation path quality of each subcarrier on the basis of the received pilot signal, and determines at the process P103 a modulation method for each subcarrier by using the algorithm described earlier. Subsequently, the transmitting station allocates at the process P104 the coded codeword to subcarriers so that the allocated codeword at each subcarrier may have the maximum bit number per symbol of the subcarrier group to which the subcarrier belongs, the maximum bit number having been received earlier at the process P124, modulates, among the allocated signals, only the portion corresponding to the number of the bits that are transmittable by the modulation method determined in the process P103, and transmits the modulated signal together with the pilot signal to the receiving station.

The receiving station receives at the process P204 the pilot signal and the data signal, estimates at the process P205 a propagation path quality by using the pilot signal, and then determines at the process P206 the modulation method used for the demodulation at each subcarrier by using the algorithm described earlier.

Next, the receiving station demodulates at the process P207 the data signal by using the modulation method determined at the process P206, creates the received signal having the bit number corresponding to the maximum bit number per symbol for each subcarrier by deeming the bit number that falls short of the maximum bit number per symbol of each subcarrier group determined at the process P223 to be filled by receiving the signal of zero likelihood, decodes the channel code every time the received signals corresponding to the code length are accumulated, and by so doing performs the communication by the adaptive modulation method of the first embodiment according to the present invention.

The process flow for determining the maximum bit number per symbol for each subcarrier group and the process flow for communicating the data signal have been explained above by using the separate figures, but it is possible to carry out both the processes together at the same time. That is, it is acceptable to simultaneously transmit the information on the maximum bit number per symbol of each subcarrier group transmitted at the process P224 wherein signals are transmitted from the receiving station to the transmitting station and the pilot signal transmitted at the process P201, or otherwise to commonly use the same pilot signal at the processes P121 and P104 wherein signals are transmitted from the transmitting station to the receiving station.

In the above case, a modulation method for each subcarrier and the maximum bit number per symbol of each subcarrier group are determined on the basis of a propagation path quality. However, it is possible to select, on the basis of, for example, the amount of data to be transmitted instead of the propagation path quality, a modulation method having a larger number of bits per symbol when the amount of data to be transmitted is large or a modulation method having a smaller number of bits per symbol when the amount of data is small, and also select the maximum bit number per symbol of each subcarrier group likewise.

Meanwhile, the measurement of a propagation path quality, the determination of a modulation method for each subcarrier, and the determination of the maximum bit number per symbol of each subcarrier group are carried out in a sequence of flow in the above explanation, but it is not necessary to carry out all of those at a time. For example, by determining a modulation method for each subcarrier on the basis of the results of measuring a propagation path quality over one time, the influence of the variation of the measurement results can be suppressed. Further, by making the cycle of the determination of the maximum bit number per symbol of each subcarrier group longer than the cycle of the determination of a modulation method for each subcarrier, it becomes possible to reduce the communication amount on the maximum bit number per symbol of each subcarrier group exchanged between the transmitting and receiving stations, while each subcarrier keeps following the variation of the propagation path. Further, when a modulation method for each subcarrier is determined without changing the maximum bit number per symbol of the subcarrier group, a modulation method that has the bit number per symbol equal to or smaller than the maximum bit number per symbol of the subcarrier group to which the subcarrier belongs is selected.

Further, it is not necessarily required to determine a modulation method for each subcarrier simultaneously at the transmitting and receiving stations and it is acceptable to change the modulation method only at one of the stations. Furthermore, it is also possible to always select for each subcarrier the modulation method having the same bit number per symbol as the maximum bit number per symbol of the subcarrier group to which the subcarrier belongs at either the transmitting or receiving station.

Figure 5:
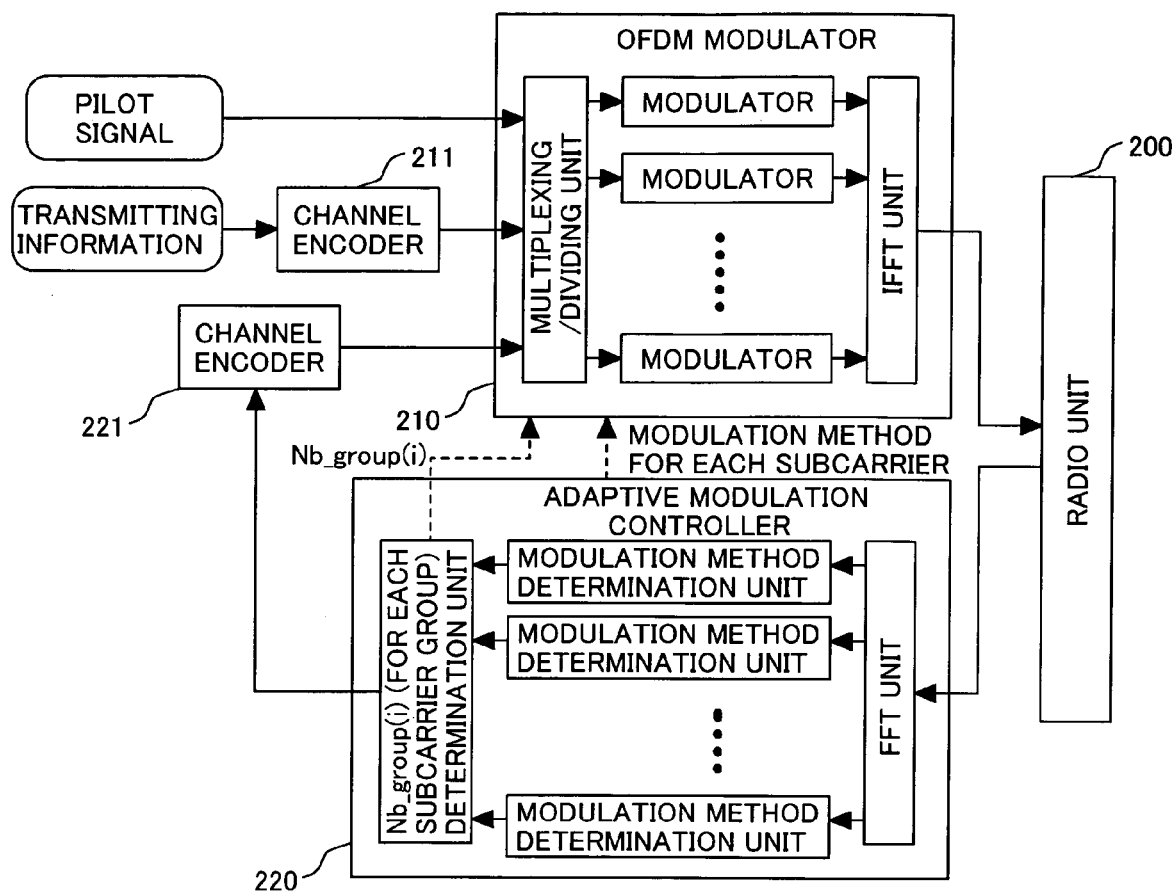
FIG. 5 is a first embodiment of a transmitting station according to the present invention.
Figure 6:
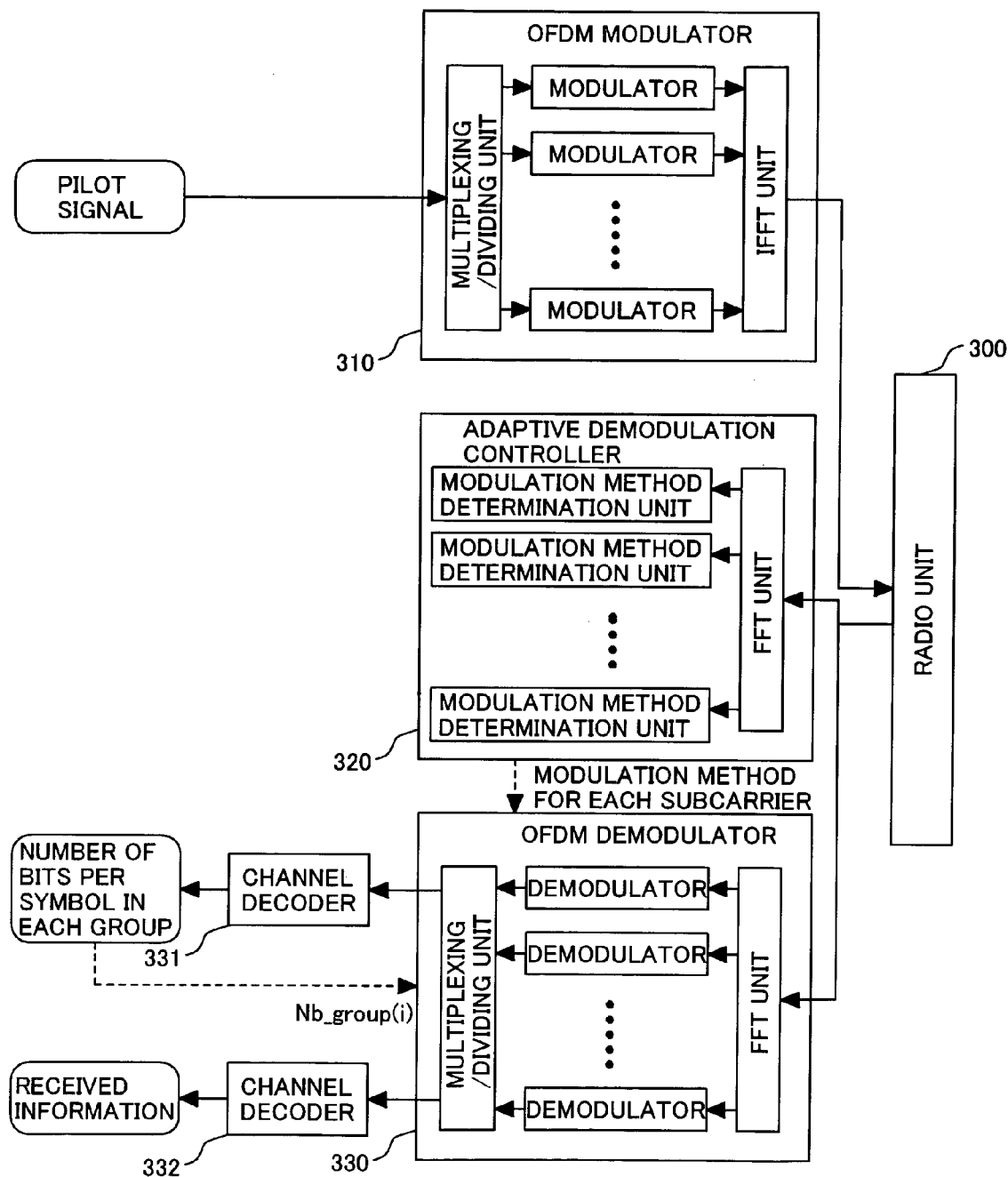
FIG. 6 is a first embodiment of a receiving station according to the present invention.

The configuration of the transmitting and receiving stations to which the first embodiment according to the present invention is applied is hereunder explained on the basis of the block diagrams of the transmitting station shown in FIG. 5 and the receiving station shown in FIG. 6.

At the transmitting station shown in FIG. 5, the radio unit 200 receives the pilot signal transmitted from the receiving station and inputs it to the adaptive modulation controller 220. The adaptive modulation controller 220 divides and allocates the received pilot signal to subcarriers through the processing such as FFT (Fast Fourier Transform), decides the propagation path quality of each subcarrier, and determines the maximum bit number per symbol of each subcarrier group and a modulation method for each subcarrier on the basis of the algorithm described earlier.

The information on the maximum bit number per symbol of each subcarrier group determined at the adaptive modulation controller 220 is coded by the channel encoder 221 and input to the OFDM modulator 210 together with the transmitting information coded at the channel encoder 211 and the pilot signal.

The OFDM modulator 210 multiplexes the input pilot signal, the transmitting information coded at the channel encoder 211, and the information on the maximum bit number per symbol of each subcarrier group coded at the channel encoder 221 and divides and allocates the multiplexed signal to subcarriers on the basis of the maximum bit number per symbol of each subcarrier group. In each subcarrier, the transmitting information coded at the channel encoder 211 is modulated by the modulation method for each subcarrier determined at the adaptive modulation controller 220 and the pilot signal and the information on the maximum bit number per symbol of each subcarrier group are modulated by the predetermined modulation method. Then the modulated information is compounded into the signal of time series through the process such as IFFT (Inverse Fast Fourier Transform) or the like and transmitted from the radio unit 200.

In the meantime, at the receiving station shown in FIG. 6, among the signals received by the radio unit 300, the pilot signal is input to the adaptive demodulation controller 320 and the other signals are input to the OFDM demodulator 330.

The adaptive demodulation controller 320 divides and allocates the input pilot signal to subcarriers through FFT, decides the propagation path quality of each subcarrier, and determines the modulation method used for the demodulation at each subcarrier on the basis of the algorithm described earlier.

The OFDM demodulator 330 divides and allocates the input signal to subcarriers through FFT and demodulates the divided signals by the modulation method used for demodulating the information on the predetermined maximum bit number per symbol of each subcarrier group, the channel decoder 331 decodes the demodulated signal, and resultantly the information on the maximum bit number per symbol of each subcarrier group is obtained.

Also, the OFDM demodulator 330 divides and allocates the input signal to subcarriers through FFT, demodulates the divided signals by the modulation method determined at the adaptive demodulation controller 320, and compounds the demodulated signals in accordance with the maximum bit number per symbol of each subcarrier group obtained earlier, the channel decoder 332 decodes the channel code, and resultantly the received signal adaptively modulated according to the present invention is obtained.

Further, at the receiving station shown in FIG. 6, the pilot signal is divided and allocated to subcarriers at the OFDM modulator 310, modulated at each subcarrier, compounded into the signal of time series through IFFT, and transmitted from the radio unit 300.

Figure 7:
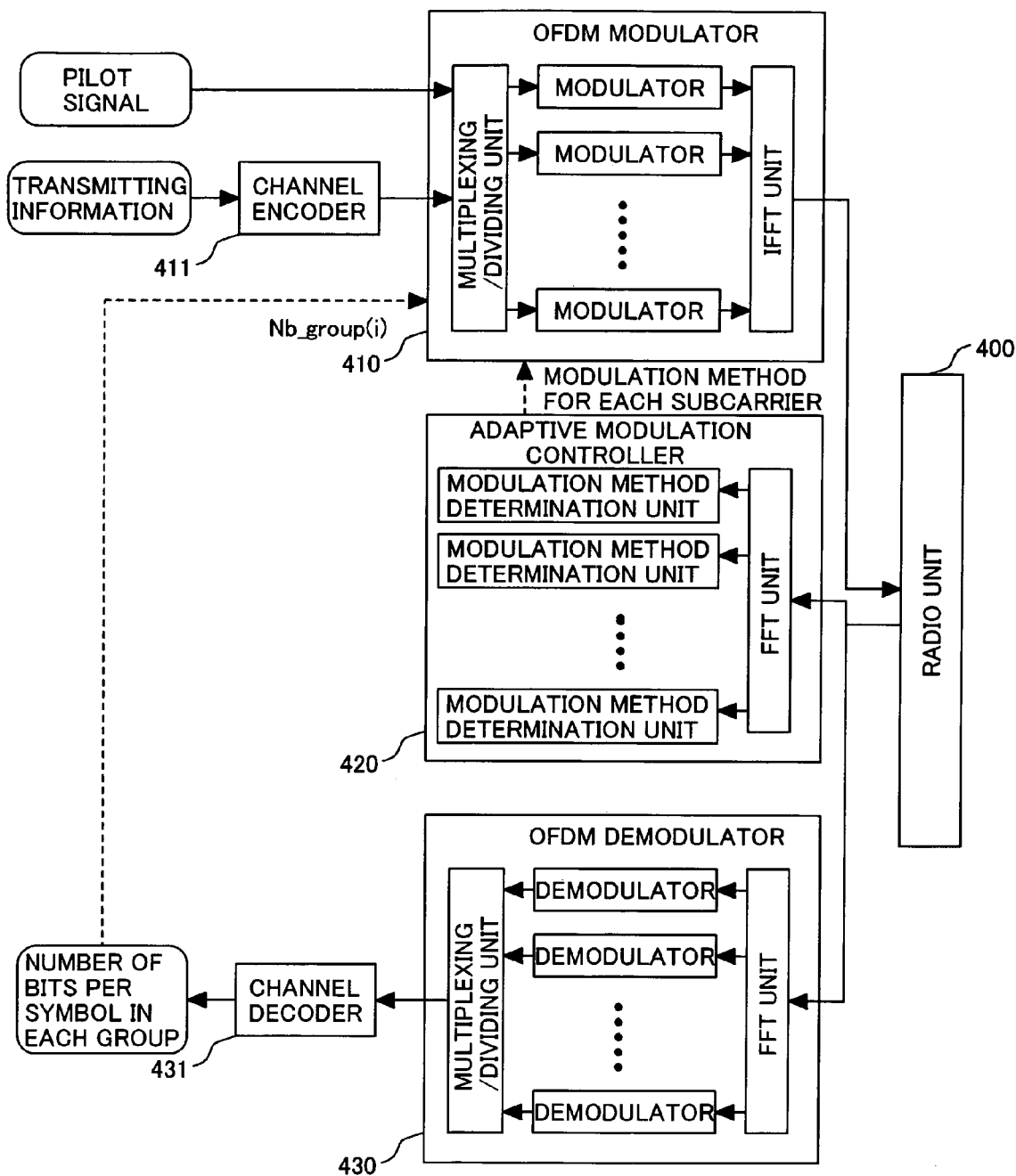
FIG. 7 is a second embodiment of a transmitting station according to the present invention.
Figure 8:
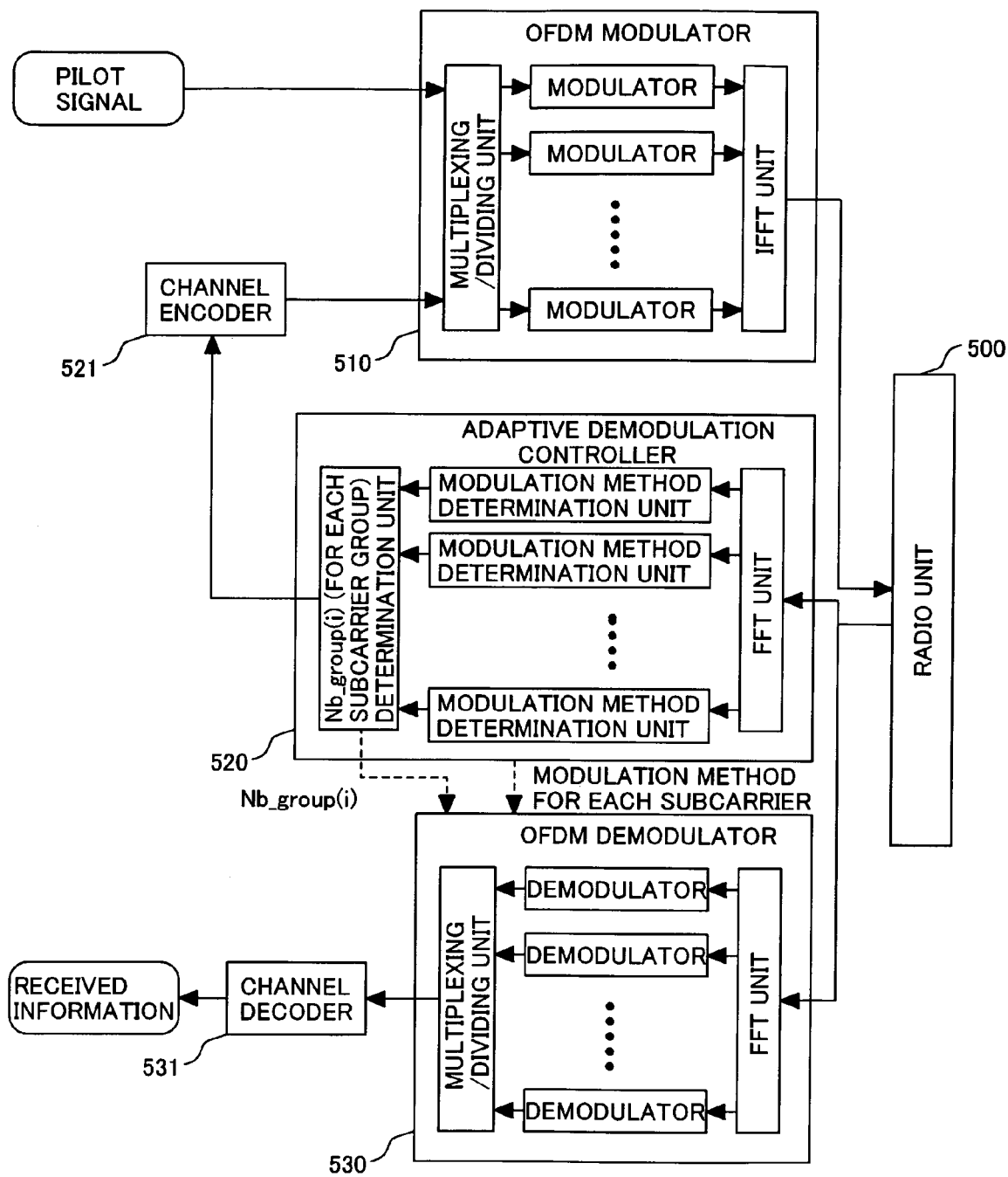
FIG. 8 is a second embodiment of a receiving station according to the present invention.

The configuration of the transmitting and receiving stations to which the second embodiment according to the present invention is applied is hereunder explained on the basis of the block diagrams of the transmitting station shown in FIG. 7 and the receiving station shown in FIG. 8.

At the transmitting station shown in FIG. 7, among the signals received by the radio unit 400, the pilot signal is input to the adaptive modulation controller 420 and the other signals are input to the OFDM demodulator 430.

The adaptive modulation controller 420 divides and allocates the received pilot signal to subcarriers through FFT, decides the propagation path quality of each subcarrier, and determines a modulation method for each subcarrier on the basis of the algorithm described earlier.

The OFDM demodulator 430 divides and allocates the received signal to subcarriers through FFT, demodulates the divided signal at each subcarrier by the predetermined modulation method used for demodulating the information on the maximum bit number per symbol of each subcarrier group, and multiplexes the demodulated signals, thereafter the channel decoder 431 decodes the multiplexed signal, and resultantly the information on the maximum bit number per symbol of each subcarrier group is obtained.

The OFDM modulator 410 multiplexes the transmitting information that has been coded at the channel encoder 411 and the pilot signal, divides and allocates the multiplexed information to subcarriers in accordance with the information on the maximum bit number per symbol of each subcarrier group obtained as a result of the decoding at the channel decoder 431, modulates the divided signal at each subcarrier by the modulation method determined at the adaptive modulation controller 420, transforms the modulated signals into the signal of time series through IFFT, and transmits the signal from the radio unit 400.

In the meantime, at the receiving station shown in FIG. 8, among the signals received by the radio unit 500, the pilot signal is input to the adaptive demodulation controller 520 and the other signals are input to the OFDM demodulator 530.

The adaptive demodulation controller 520 divides and allocates the input pilot signal to subcarriers through FFT, decides the propagation path quality of each subcarrier, and determines the modulation method used for demodulating the divided pilot signal at each subcarrier and the maximum bit number per symbol of each subcarrier group on the basis of the algorithm described earlier.

The OFDM demodulator 530 divides and allocates the input signal to subcarriers through FFT, demodulates the divided signal at each subcarrier by the modulation method determined at the adaptive demodulation controller 520, and compounds the demodulated signals in accordance with the maximum bit number per symbol of each subcarrier group determined also at the adaptive demodulation controller 520, the channel decoder 531 decodes the channel code, and resultantly the received signal adaptively modulated according to the present invention is obtained.

Further, at the receiving station shown in FIG. 8, the maximum bit number per symbol of each subcarrier group determined at the adaptive demodulation controller is coded at the channel encoder 521, multiplexed with the pilot signal at the OFDM modulator 510, divided and allocated to subcarriers, modulated at each subcarrier, compounded into the signal of time series through IFFT, and transmitted from the radio unit 500.

Here, the pilot signal is used for the purpose of estimating the propagation path quality of each subcarrier and therefore the pilot signal may be modulated not by the modulation method determined at the adaptive modulation controller 220 or 420 but by a fixed modulation method.

The terms code and coding used in the above explanations indicate not only the coding by an error-correcting code such as a simple convolutional code or a turbo code but also, more commonly, the mapping from the information on a communication object to a binary digit string for modulation. For example, the processing including the addition of an errordetecting code and signal processing such as interleave, repetition, and puncture is collectively called coding.

In the above processing, it is not necessary that the code and coding used for a data signal are identical to the code and coding used for the bit number per symbol of each subcarrier group and, for the bit number per symbol of each subcarrier group in particular, a code having a weak error-correcting capability can be used or even no coding may be used.

Further, in the above processing, the transmission data subjected to channel coding is divided and allocated to subcarriers so that the divided data at each subcarrier may have the bit number corresponding to the bit number per symbol and modulated at each subcarrier, but it is also possible to apply processing likewise by dividing the transmission data subjected to channel coding so that the divided transmission data at each subcarrier may have an integral multiple of the bit number per symbol and thus producing the data having the integral number of bits per symbol at each subcarrier.

Furthermore, in the above processing, though the data signal, the pilot signal and the maximum bit number per symbol of each subcarrier group are all divided and allocated to subcarriers and then transmitted likewise, it is still acceptable to transmit a specific signal by limiting it to a specific subcarrier.

Further, in the above processing, though the data signal, the pilot signal and the maximum bit number per symbol of each subcarrier group are all divided and allocated to subcarriers and then transmitted likewise, it is still acceptable to transmit a specific signal not by dividing and allocating it to subcarriers but by temporally multiplexing the signal with other signals.

In addition, though control by an adaptive modulation method is described above, it is possible to obtain a greater effect of improving characteristics by adaptively controlling the coding rate of a channel code at the same time. The adaptive control of a coding rate is equally applicable to both the first and second embodiments, and the processing is identical except that the portions from which the information for the control is obtained are different from each other. Therefore, the configuration of the case where the adaptive coding rate control, in addition to the adaptive modulation method used in the first embodiment, is applied is hereunder explained as an example on the basis of the drawings.

Figure 9:
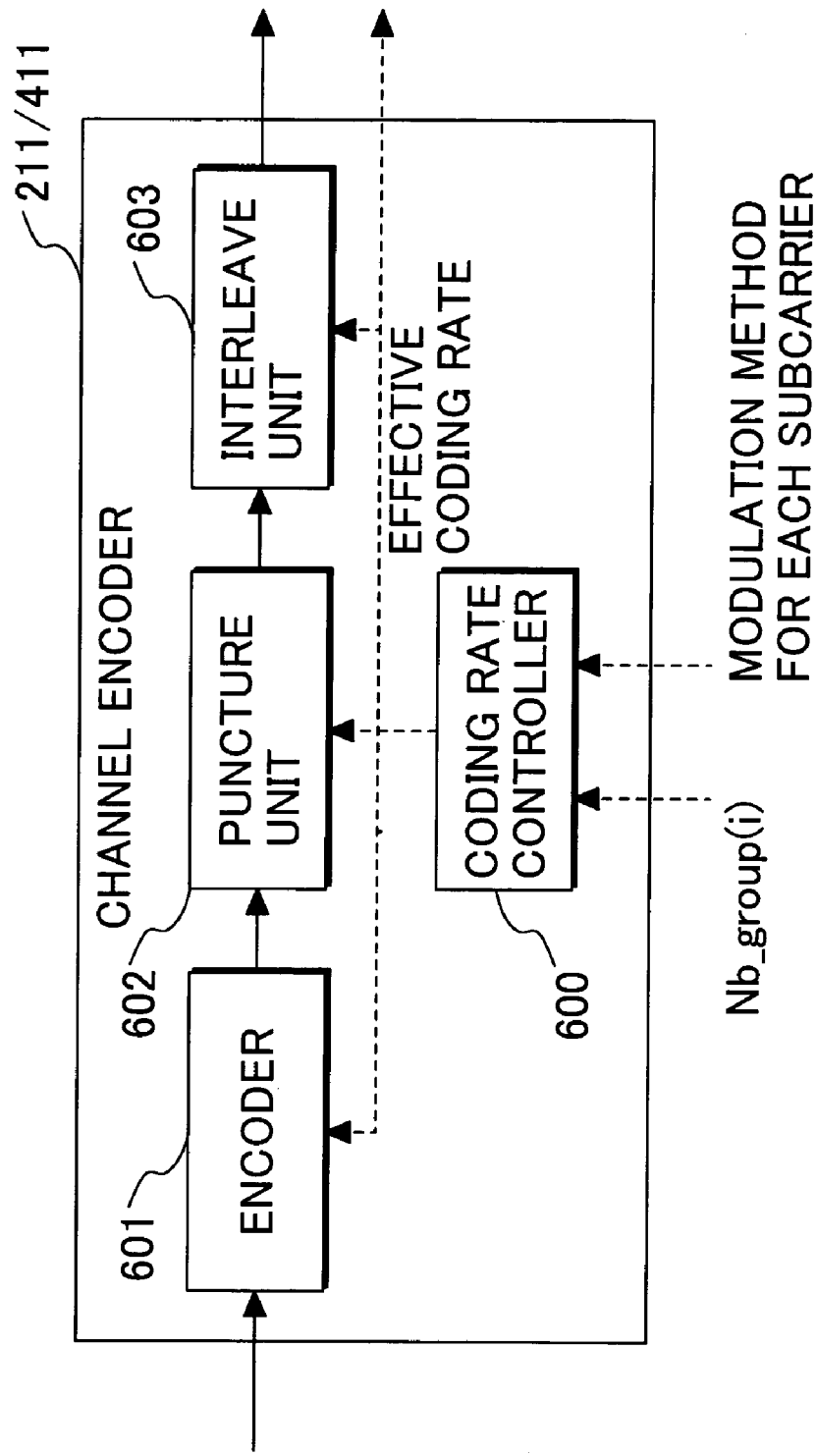
FIG. 9 is an example of a channel encoder according to the present invention.

FIG. 9 is an example of the channel encoder 211 in the first embodiment in the case where a coding rate is adaptively controlled. The channel encoder firstly acquires the information on the maximum bit number per symbol of each subcarrier group (Nb_group(i)) and a modulation method for each subcarrier from the adaptive modulation controller 220, and then the acquired information is input to the coding rate controller 600.

Meanwhile, the information to be coded is input to the encoder 601 and coded here with the code having a fixed coding rate 1/Rc, and the codeword having the code length Rc times that of the original information is produced. Thereafter, the codeword coded at the encoder 601 is punctured at the puncture unit 602 in proportion to the substantial coding rate 1/Rr output from the coding rate controller 600, the code length is reduced, the punctured codeword having the length Rr times that of the original information is produced, and the signal interleaved at the interleave unit 603 and subjected to the adaptive coding rate control is output.

The coding rate controller 600 determines a substantial coding rate 1/Rr from the total amount Nb produced by adding the maximum bit number per symbol of each subcarrier group for all the subcarriers and the total amount Nm produced by adding the number of bits communicable by a modulation method for each subcarrier per symbol for all the subcarriers.

With regard to a means of determining a substantial coding rate 1/Rr, it is possible, for example, to select a code having a coding rate with a stable error resistance in accordance with the adaptively controllable modulation method by determining the substantial coding rate 1/Rr so as to satisfy the relation Rr=Rb×Nb/Nm on the basis of the standard coding rate 1/Rb.

Here, with regard to a means of determining a substantial coding rate 1/Rr, it is not always necessary to determine the substantial coding rate 1/Rr so as to satisfy the relation Rr=Rb×Nb/Nm, and any relation is acceptable as long as an Rr value not so small as the value of Nb/Nm increases is selected. For example, a means wherein a coding rate close to 1/(Rb×Nb/Nm) is selected from among plural coding rates prepared beforehand may be employed.

Further, when a determined substantial coding rate 1/Rr is smaller than a fixed coding rate 1/Rc, either not puncture processing but repetition processing, wherein some bits are repeatedly output, is applied at the puncture unit 602, or other processing is applied, wherein a value identical to 1/Rc is used simply as the substantial coding rate 1/Rr of puncture and puncture processing is not applied at the puncture unit 602.

In addition, it is also possible to output from the channel encoder the information representing the substantial coding rate obtained at the coding rate controller 600, input it to the OFDM modulator 210, and transmit it together with other information to the receiving station.

Figure 10:
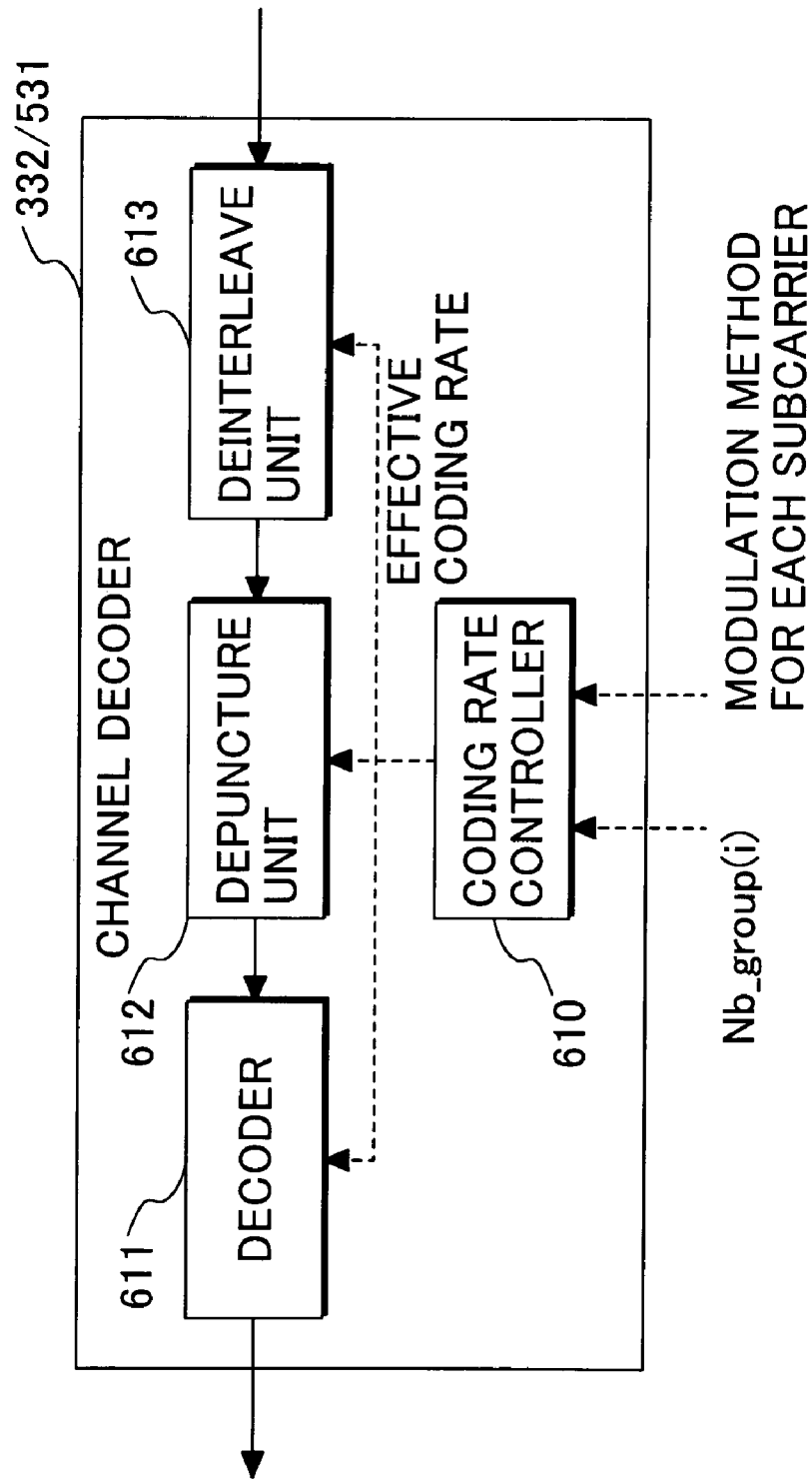
FIG. 10 is an example of a channel decoder according to the present invention.

FIG. 10 is an example of the channel decoder 332 in the first embodiment when a coding rate is adaptively controlled. The channel decoder firstly obtains the maximum bit number per symbol of each subcarrier group (Nb_group(i)) from the output of the channel decoder 331 and a modulation method for each subcarrier from the adaptive demodulation controller 320, and then inputs them to the coding rate controller 610.

The coding rate controller 610 determines a substantial coding rate 1/Rr. With regard to a means of determining a substantial coding rate 1/Rr, besides the method of determining it by using a calculation method similar to that employed in the coding rate controller 600 of the channel encoder 211, it is also possible to use the value transmitted from the transmitting station.

Meanwhile, the signal to be decoded is input from the OFDM demodulator 330 to the deinterleave unit 613, deinterleaved as the code of the substantial coding rate 1/Rr, supplied with the signal of zero likelihood as the depuncture processing at the depuncture unit 612, and decoded as the code corresponding to the fixed coding rate 1/Rc at the decoder 611, and by so doing the signal subjected to adaptive coding rate control is received.

Here, it is also possible to determine plural candidate values as a substantial coding rate 1/Rr at the coding rate controller 610, subject each substantial coding rate 1/Rr to deinterleave, depuncture and decoding, and use the decoded result of 1/Rr which has successfully been decoded as the signal subjected to adaptive coding rate control.

Further, when a substantial coding rate 1/Rr is smaller than a fixed coding rate 1/Rc, the processing of adding the signals subjected to repetition to each other is applied instead of inserting the signal of zero likelihood at the depuncture unit 612.

The present invention shown above makes it possible to determine a modulation method individually for every subcarrier without the necessity of sharing the information on the modulation method for every subcarrier between the transmitting and receiving stations by determining the modulation method individually for each subcarrier at the transmitting and receiving stations. Also it is possible to rightly demodulate the adaptively modulated signal at the receiving station without the necessity of sharing a modulation method for each subcarrier between the transmitting and receiving stations by sharing the maximum bit number per symbol of each subcarrier group, instead of a modulation method for each subcarrier, between the transmitting and receiving stations and using it for channel coding and decoding. Further, it becomes possible to communicate in a stable quality, even when the relation between the maximum bit number per symbol of each subcarrier group and a modulation method for each subcarrier varies, by controlling the coding rate on the basis of the sum of the maximum bit number per symbol of every subcarrier group and the sum of the bit number per symbol communicable by a modulation method for each subcarrier.

Figure 11:
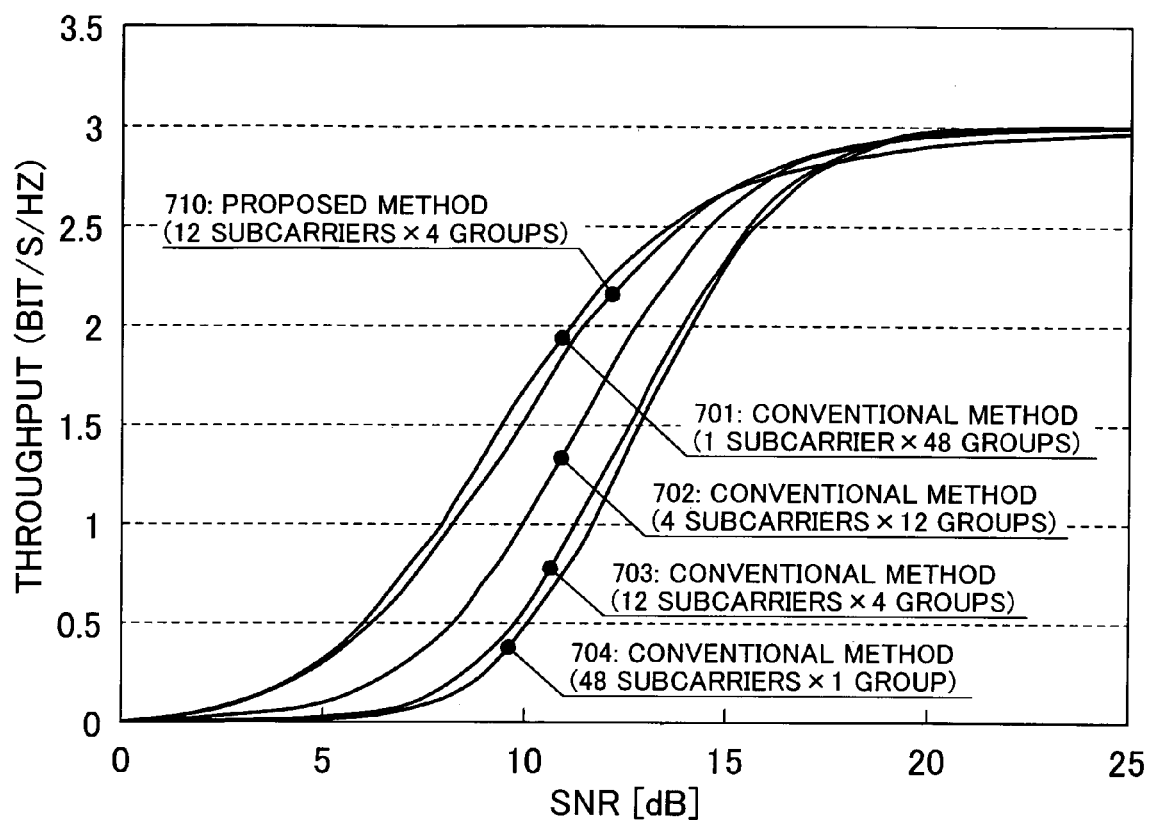
FIG. 11 is an example of the throughput characteristics caused by the effect of the present invention.

The examples of the throughput characteristics showing the aforementioned effects are shown in FIG. 11. In FIG. 11, the horizontal axis represents SNR, namely the signal to noise power ratio, and the vertical axis represents the throughput, namely the bit number communicable per unit frequency and band. Each curve in the figure shows the throughput characteristics when 48 subcarriers are allocated at an interval of 312.5 kHz in the propagation environment wherein the delayed signal exponentially attenuates at a dispersion of 70 ns. The curves 701, 702, 703, and 704 show the relationship between the throughput and the signal to noise power ratio by the conventional method wherein the numbers of subcarriers per subcarrier group are set at 1, 4, 12, and 48 respectively, the modulation method is changed among QPSK, 16QAM, and 64QAM in accordance with the propagation path quality of a subcarrier group, and a turbo code having the coding rate of ½ is used. In contrast, the curve 710 shows the relationship between the throughput and the signal to noise power ratio by the method according to the present invention wherein the number of subcarriers per subcarrier group is set at 12, the modulation method is changed among QPSK, 16QAM, and 64QAM in accordance with the propagation path quality of a subcarrier group, the maximum bit number per symbol is determined in accordance with the propagation path quality of a subcarrier, and coding rate control is applied so that the substantial coding rate may be ½. From the figure, it is confirmed that the curve 710 according to the present invention, even with the small divided number of the subcarrier groups, shows good throughput characteristics close to the characteristics of the curve 701 obtained by the conventional method wherein each subcarrier is controlled individually.

What is claimed is:

1. A radio-communication system, said radio-communication system comprising a first radio station that divides and allocates a transmit signal coded at an encoder to plural subcarriers and transmits the divided signals and a second radio station that combines plural received signals each of which has been demodulated individually at each of the subcarriers and decodes the combined signal, wherein said plural subcarriers are grouped into plural subcarrier groups each of which includes one or more subcarriers;

said first and second radio stations share information on a first bit number which is the maximum number of transmitting bits per symbol of each of said plural subcarrier groups;

said first radio station divide and allocate the coded transmit signal to each of the subcarriers so that the divided transmit signal at each of said subcarriers may have said first bit number of the subcarrier group to which said subcarrier belongs;

each of the subcarriers determines the second bit number; and at least a part of the transmit signal allocated to each of the subcarriers by the first radio station is modulated by a first modulation method capable of transmitting a second bit number;

said second radio station comprises a demodulator which demodulates the signal received from said first radio station by a second modulation method capable of transmitting a third bit number per symbol that is determined for each of the subcarriers, outputs said first bit number per symbol of the subcarrier group to which said subcarrier belongs to a decoder as the result of the demodulation; and said decoder combines plural signals each of which has been demodulated individually at each subcarrier into a signal and decodes said signal;

wherein said first radio station determines said second bit number of each of the subcarriers on the basis of the state of the propagation path of said subcarrier between said first and second radio stations; and wherein said second radio station determines said third bit number of each of the subcarriers on the basis of the state of the propagation path of said subcarrier between said first and second radio stations.

2. The radio-communication system according to claim 1, wherein said second and third bit numbers are not larger than said first bit number.

3. The radio-communication system according to claim 1, wherein said first bit number is determined on the basis of the state of a propagation path of said subcarrier group which is decided by receiving at said first radio station a standard signal transmitted from said second radio station, and information on said determined first bit number is conveyed from said first radio station to said second radio station.

4. The radio-communication system according to claim 1, wherein said first bit number is determined on the basis of the state of the propagation path of said subcarrier group which is decided by receiving at said second radio station a standard signal transmitted from said first radio station, and said determined first bit number is conveyed from said second radio station to said first radio station.

5. The radio-communication system according to claim 1, wherein said encoder changes a coding rate in accordance with the state of a propagation path between said first and second radio stations.

6. A radio station employed in a radio-communication system, wherein a radio channel includes plural subcarriers, said plural subcarriers are grouped into plural subcarrier groups each of which includes one or more subcarriers, and information on a first bit number which is the maximum number of transmitting bits per symbol of each of said plural subcarrier groups is shared among plural radio stations for transmission and reception, comprising:

an encoder that codes a transmit signal;

a modulator that divides and allocates said coded transmit signal to subcarriers so that the divided transmit signal at each of said subcarriers may have said first bit number of the subcarrier group to which said subcarrier belongs and modulates at least a part of the transmit signal allocated to each of the subcarriers by a modulation method capable of transmitting a second bit number per symbol that is determined for said each subcarrier;

a radio unit for transmitting said modulated transmit signal to a receiving station; and an adaptive modulation controller determines said second bit number of each of the subcarriers on the basis of the state of the propagation oath of each of the subcarriers between said radio station and said receiving station.

7. The radio station according to claim 6, wherein said second bit number is not larger than said first bit number.

8. The radio station according to claim 6, further comprising an adaptive modulation controller that determines said first bit number on the basis of the state of a propagation path of a subcarrier group which is decided by receiving a standard signal transmitted from said receiving station.

9. The radio station according to claim 6, wherein the radio station receives from said receiving station the information on said first bit number which is determined at said receiving station on the basis of the state of a propagation path between said radio station and said receiving station.

10. The radio station according to claim 6, wherein said encoder changes a coding rate in accordance with the state of the propagation path between said first and second radio stations.

11. The radio station according to claim 6, wherein said encoder changes a coding rate in accordance with said first and second bit numbers.

12. The radio station according to claim 11, wherein said encoder uses a code having a higher coding rate as said second bit number is increasingly smaller than said first bit number.

13. A radio station-employed in a radio-communication system, wherein a radio channel includes plural subcarriers, said plural subcarriers are grouped into plural subcarrier groups each of which includes one or more subcarriers, and information on a first bit number which is the maximum number of transmitting bits per symbol of each of said plural subcarrier groups is shared among plural radio stations for transmission and reception, comprising:

a demodulator which demodulates a signal received from a transmitting station by a modulation method capable of transmitting a third bit number per symbol that is determined for said each subcarrier and outputs to a decoder the demodulated signal at each of the subcarriers so that said demodulated signal may have said first bit number per symbol of the subcarrier group to which said subcarrier belongs as a result of the demodulation;

a decoder which combines plural signals each of which has been demodulated individually at each of the subcarriers and decodes the combined signal; and an adaptive modulation controller determines said third bit number of each of the subcarriers on the basis of the state of the propagation path of each of the subcarriers between said radio station and said transmitting station.

14. The radio station according to claim 13, wherein said third bit number is not larger than said first bit number.

15. The radio station according to claim 13, wherein the radio station receives from said transmitting station the information on said first bit number which is determined at said transmitting station on the basis of the state of a propagation path between said radio station and said transmitting station.

16. The radio station according to claim 13, further comprising an adaptive modulation controller that determines said first bit number on the basis of the state of a propagation path of a subcarrier group which is decided by receiving a standard signal transmitted from said transmitting station.

17. A radio communication system comprising:

a first radio station, and a second radio station, wherein said first radio station is arranged to:

divide a transmit signal which is coded at an encoder, allocate the coded transmit signal to each of a plurality of subcarriers by a first bit number, which is shared by each of a plurality of subcarrier groups, determine a first modulation method which is able to transmit a second bit number per symbol of each of the plurality of subcarriers, and modulate at least a part of the transmit signals which are allocated to each of the subcarriers using the first modulation method;

wherein said second radio station is arranged to:

determine a second modulation method which is able to transmit a third bit number per symbol of each of the plurality of subcarriers, demodulate the signal which is received from said first radio station using the second modulation method, decode the signal which is received from said first radio station using the second modulation method, and decode the signal into which the signals demodulated at each of the subcarriers are combined, wherein said plurality of subcarriers are grouped into said plurality of subcarrier groups, each of which includes one or more subcarriers, and said first and second radio stations share information on a first bit number which is the maximum number of transmitting bits per symbol of each of said plural subcarrier groups.

18. A radio-communication system according to claim 17, wherein said first radio station determines said second bit number on the basis of the state of the propagation path of said subcarrier between said first radio station and said second radio station.

19. A radio-communication system according to claim 17, wherein said second radio station determines said third bit number on the basis of the state of the propagation path of said subcarrier between said first radio station and said second radio station.

20. A radio-communication system according to claim 17, wherein, if the third bit number is smaller than the first bit number, the second radio station adds a dummy signal to a demodulation result.

21. A radio-communication system according to claim 20, wherein the dummy signal is the signal of zero likelihood.

* * * * *